Figure 1:
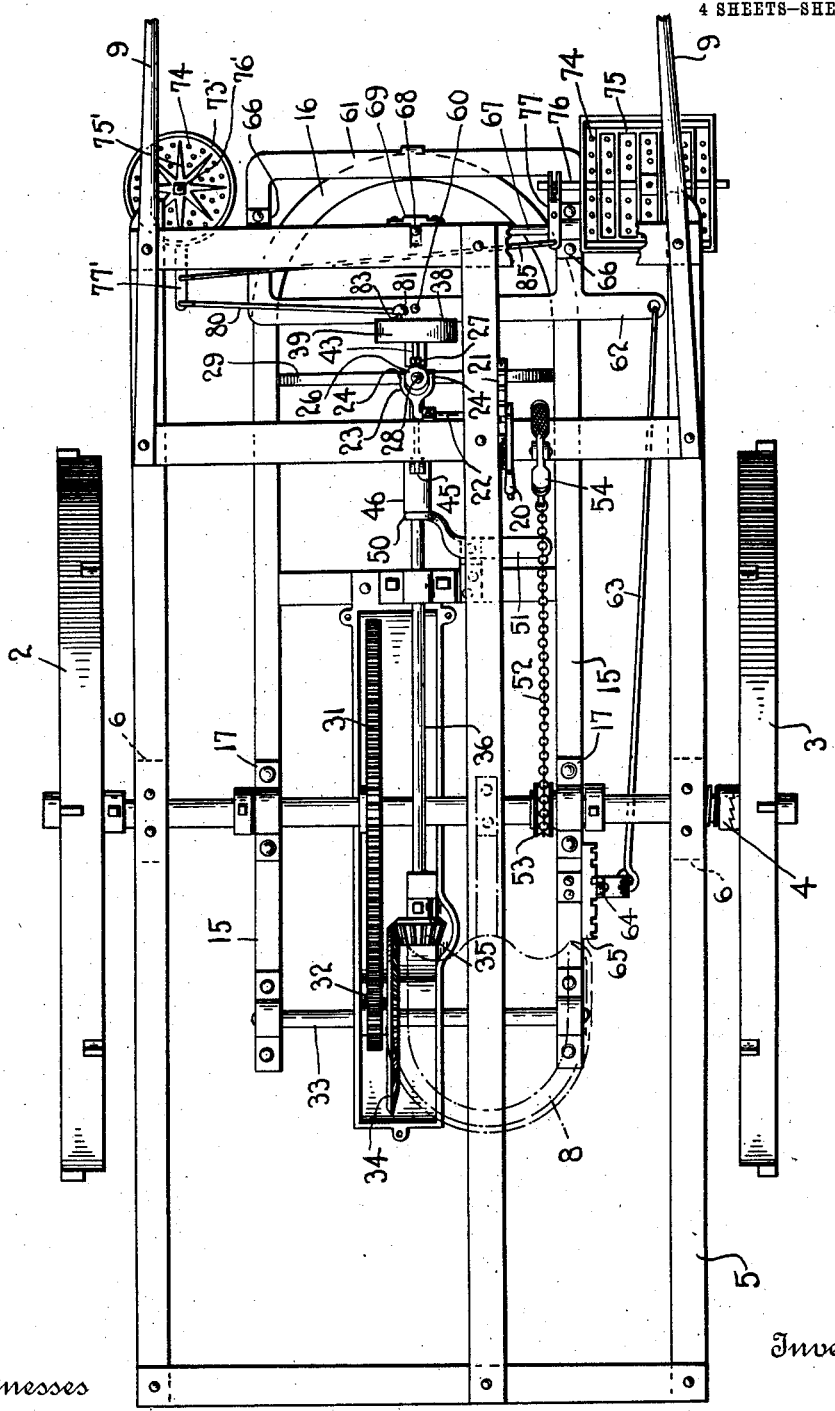

N. MERONEK.
DISTRIBUTING MACHINE.
APPLICATION FILED AUG. 14, 1911.

1,021,544.

Patented Mar. 26, 1912.

4 SHEETS—SHEET 1.

Witnesses
L. B. James
N. L. Collamer

Inventor
N. Meronek
by H. B. Willison &co
Attorneys

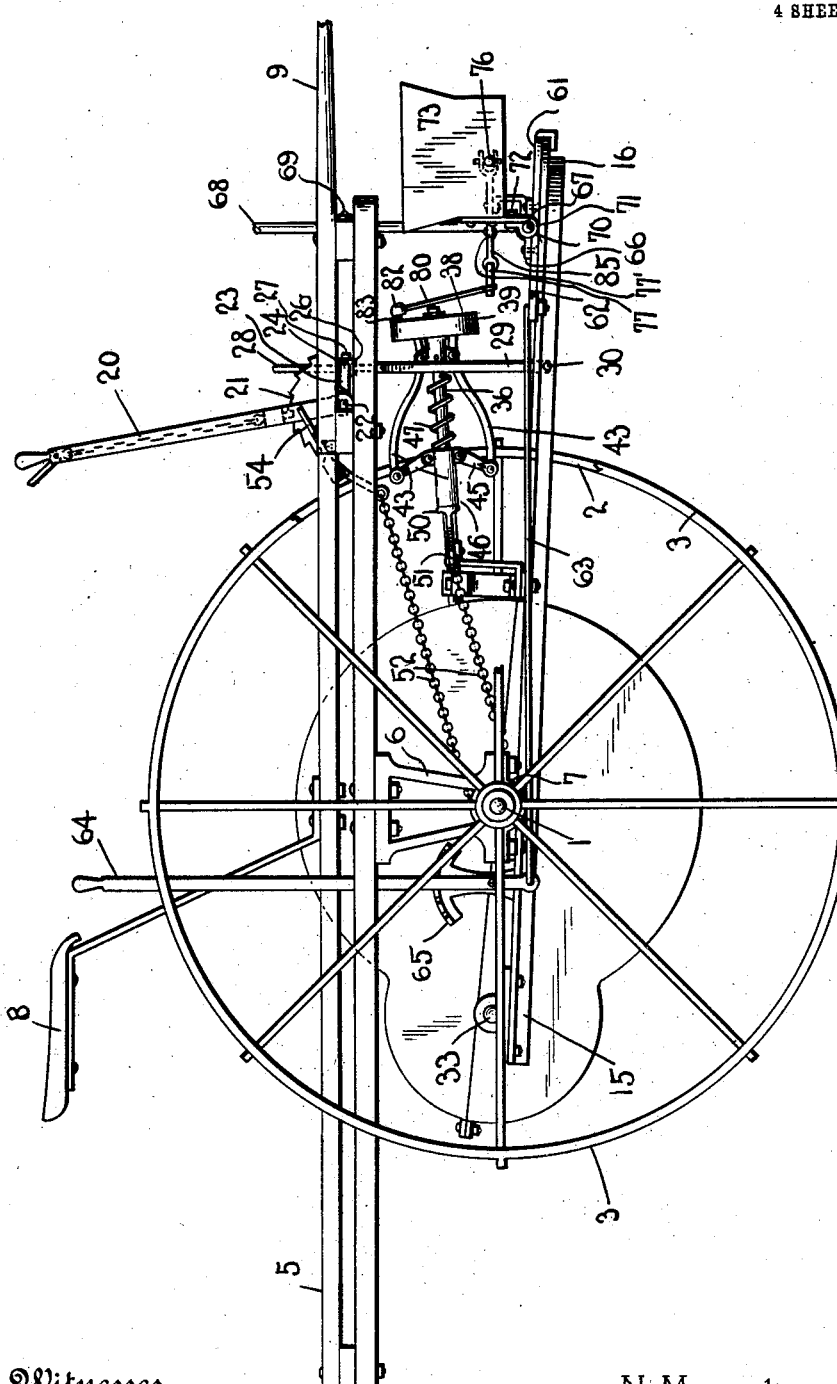

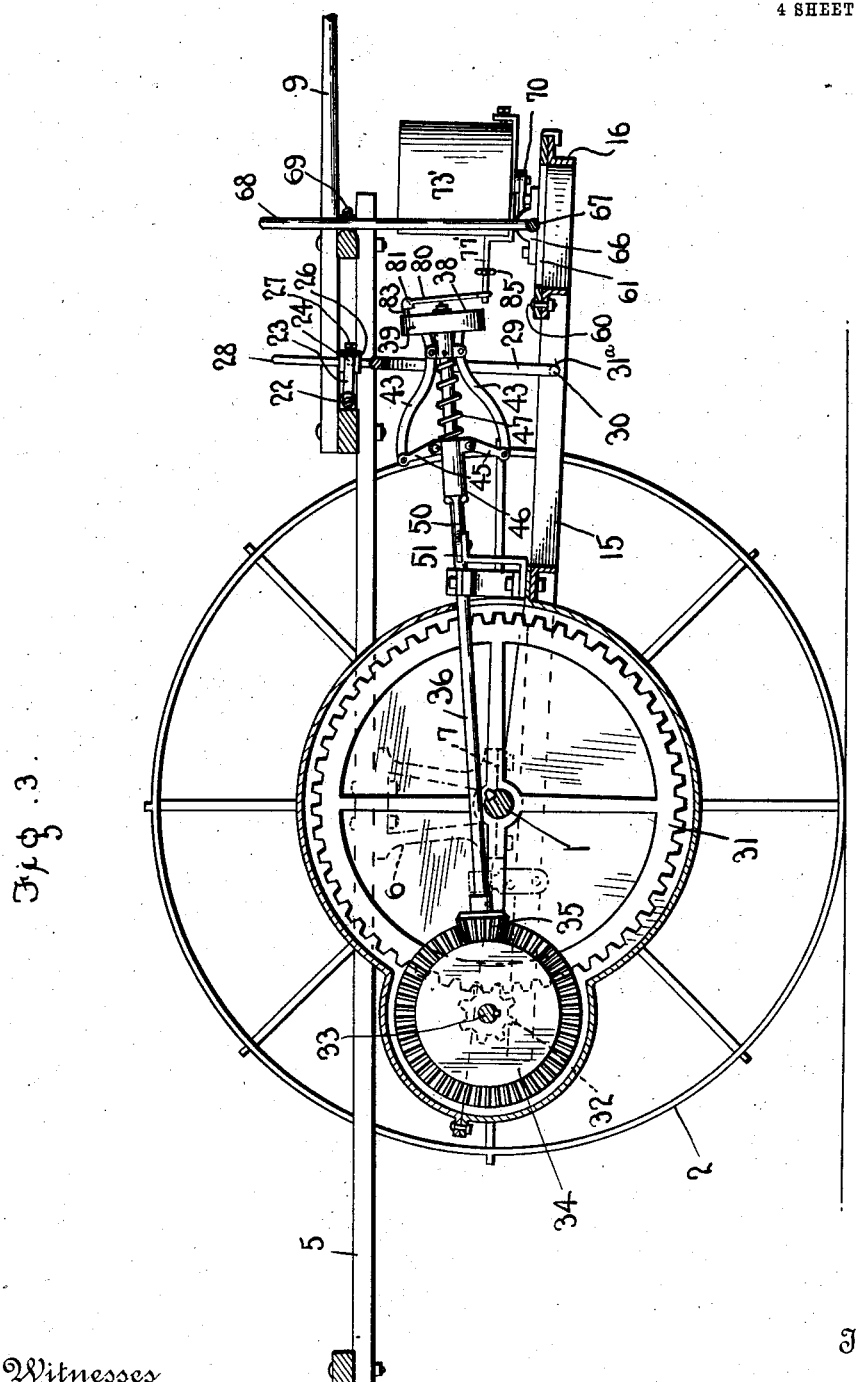

N. MERONEK.
DISTRIBUTING MACHINE.
APPLICATION FILED AUG. 14, 1911.
1,021,544.
Patented Mar. 26, 1912.
4 SHEETS—SHEET 4.
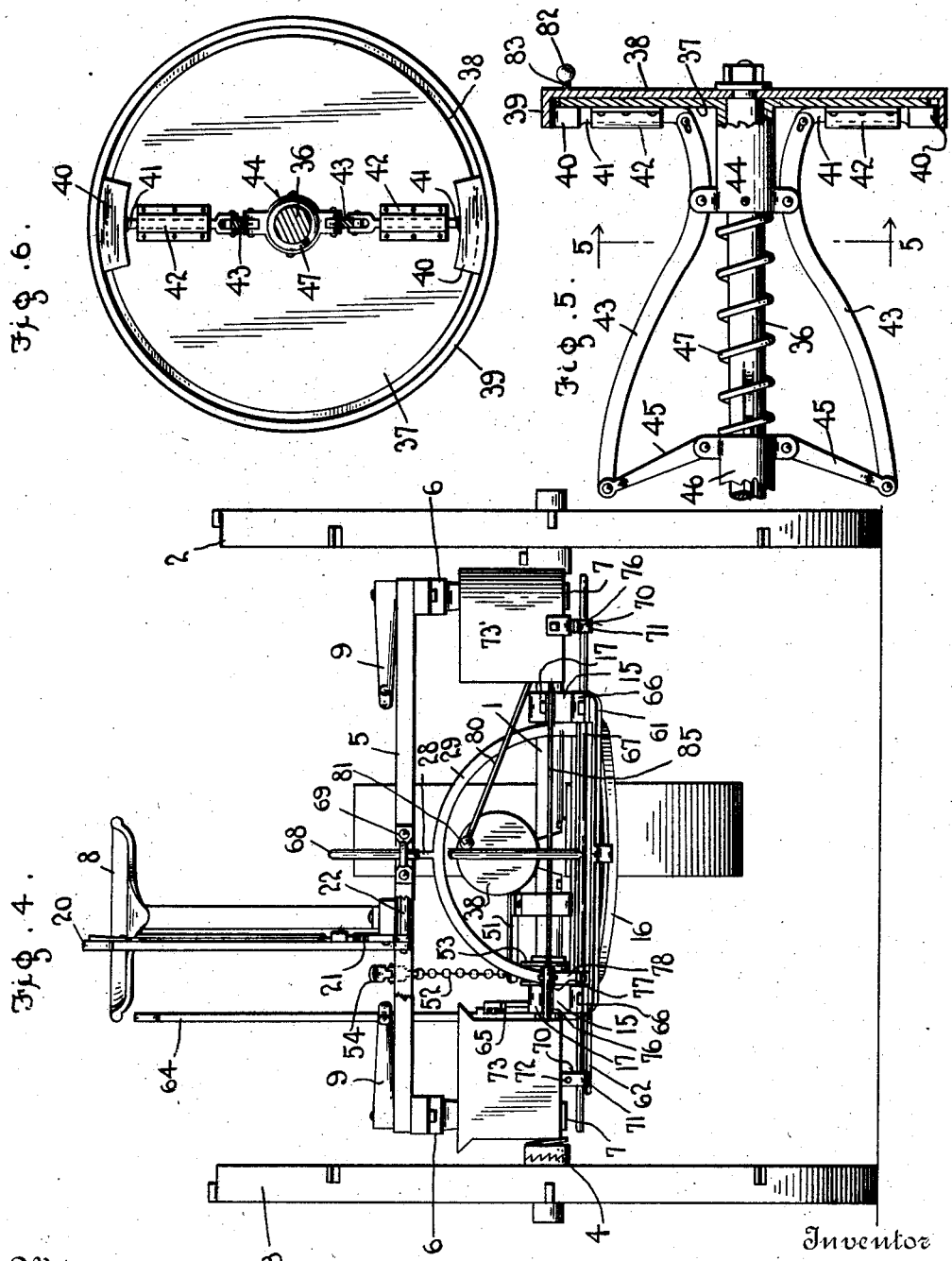
Witnesses
L. B. James
N. L. Collamer
Inventor
N. Meronek
by H. B. Willsonteo
Attorneys

UNITED STATES PATENT OFFICE.

NICK MERONEK, OF POLONIA, WISCONSIN.

DISTRIBUTING-MACHINE.

1,021,544.  Specification of Letters Patent.  Patented Mar. 26, 1912.

Application filed August 14, 1911. Serial No. 643,925.

*To all whom it may concern:*

Be it known that I, NICK MERONEK, a citizen of the United States, residing at Polonia, in the county of Portage and State of Wisconsin, have invented certain new and useful Improvements in Distributing-Machines; and I do declare the following to be a full, clear, and exact description of the invention, such as will enable others skilled in the art to which it appertains to make and use the same.

This invention relates to the class of machines known as fertilizer distributers, although it is adapted for planting certain kinds of seeds as well as for distributing fertilizer, plaster, lime, and the like; and the object of the same is to make certain improvements in machines of this character.

This object is carried out by the construction hereinafter more fully described and claimed and shown in the drawings wherein—

Figure 1 is a plan view and Fig. 2 a right side elevation of this machine complete; Fig. 3 is a central longitudinal section; Fig. 4 is a front end elevation; Fig. 5 is an enlarged central longitudinal section through the clutch, and Fig. 6 is a cross section on the line 5—5 of Fig. 5.

The framework of this improved machine comprises a running gear supported by the main axle and carrying the draft mechanism and seat, and a smaller skeleton or sub-frame also supported by the main axle and adjustably connected at one end with the running gear whereby the height of this skeleton frame and of the mechanisms mounted thereon may be adjusted by the driver at will. To one end of the main axle 1 is rigidly secured one main wheel 2, the other wheel 3 being connected to its other end by a backing ratchet or differential mechanism 4; and the main frame 5 of the running gear is supported by blocks 6 which have bearings 7 upon said axle, this frame carrying the driver's seat 8 and the draft mechanism, herein shown as a pair of thills 9 although of course other draft mechanism might be used. A sub-frame, preferably of angle iron, has its side bars 15 connected by a fifth-wheel member 16 at their front ends, whereas they are supported from the axle by bearings 17 surrounding the same inside the other bearings 7. The construction is such that the sub-frame stands in a plane somewhat beneath that of the frame 5 which is raised above the axle by the blocks 6, and the sub-frame may even be under-hung as shown. As this frame carries the mechanical elements it is wise to hang it low, whereas the other frame 5 carrying the driver and the manipulating levers may be supported somewhat higher so that the thills 9 may project straight forward from it as shown.

The vertical adjustment of the sub-frame, and hence of the mechanisms carried thereby, is effected by setting a hand lever 20 which is pivoted on the frame 5 and moves over a toothed segment 21. The shaft of this lever has a crank 22 forked at its front end at 23, and the extremities of the fork arms are bent inward toward each other at 24 and engage openings 25 on opposite sides of a block 26, which latter is adjustable by a set screw 27 on the shank 28 of a bail whose arms 29 have out-turned tips 30 engaging eyes 31ᵃ in the sub-frame 15 as shown. Therefore the adjustment of the hand lever 20 causes the rise and fall of the front end of the sub-frame beneath that of the main frame 5; and, if the length of the crank 22 is not sufficient to provide the proper adjustment, the block 26 can be set higher or lower on the shank 28 by means of the set screw 27.

The power mechanism includes a power gear 31 fast on the main axle and meshing with a driven gear 32 on a countershaft 33, the latter carrying a bevel gear 34 meshing with a driven bevel gear 35 at the rear end of the main shaft 36—these parts being suitably proportioned and supported. Secured to the front end of said shaft is a disk 37 forming one member of a clutch mechanism, whose other member is a crank wheel 38 journaled on the shaft and whose function will be described below.

The clutch mechanism may be of any suitable type, but by preference it consists of shoes 40 whose shanks 41 move radially through guides 42 carried by said disk, and are pivoted to the front ends of levers 43 which in turn are pivoted between their extremities to a collar 44 fast on the main shaft 6 and which may well form the hub of the disk 37. The shoes stand inside a surrounding flange 39 on the crank wheel 38, and when projected radially they are thrown into frictional contact with it; and the means for projecting them consist preferably of a pair of links 45 connecting the rear extremities of the levers 43 with a sleeve 46 which is splined on the shaft 6. This sleeve is moved normally away from the collar or hub 44 by an expansive spring 47 coiled on the shaft, so that its movement to the rear draws the shoes inward and opens the clutch; and the clutch is closed by means of a fork 50 at the inner end of a lever 51 pivoted on said frame, and whose outer end is connected to a chain 52 passing over a pulley 53 and attached to a treadle 54 within reach of the operator's foot. When this treadle is moved, the chain turns the lever 51 whose fork 50 presses the sleeve 46 forward against the tension of said spring 47, and the links draw in the rear ends of the levers 43 so that the clutch-shoes are thrown outward into contact with said flange 39, and the crank wheel 38 is caused to rotate with the disk and main shaft.

The distributer frame is carried by and adjustable upon the sub-frame in any suitable manner, but preferably as follows: A king bolt 60 at the center of the fifth-wheel member 16 connects the sub-frame 15 with the distributer frame 61 which lies upon the same and is movable or adjustable in a horizontal plane around said king bolt. From one end of the frame 61 projects an arm 62 connected by a rod 63 with a lever 64 which stands adjacent the driver's seat and moves over a toothed segment 65, and by adjusting this lever it is obvious that the driver can set the frame 61 around its pivot which is the king bolt 60. Mounted in boxes 66 on the ends of the frame 61 is a rock shaft 67 whose extremities carry the distributers described below, and from this shaft rises a rod 68 which extends above the front end of the main frame 5 and is guided in an eye 69 thereon.

The distributers are illustrated herein as of two types each with its appropriate agitator, but I desire it understood that I may employ two of either type or one of each as shown.

The numeral 70 designates a bracket projecting radially from each end of the rock shaft 67 and adjustably mounted thereon by having its inner end 71 passed around the shaft in the shape of an eye and its extremity bolted as at 72 to its own body, so that when the bolt is loosened the eye expands and may be adjusted on the shaft and reset. Each bracket carries the distributer body or hopper whereof that numbered 73 is rectangular and that numbered 73' is cylindrical and each has holes 74 in its bottom. The agitator numbered 75 is a skeleton structure reciprocated longitudinally within the rectangular distributer by a rod 76 connected with a lever 77 journaled in a support 78 carried by the rock shaft, whereas the agitator 75' is in the shape of a spider mounted fixedly on a bolt 76' which forms the pivotal support for the oscillating distributer 73', and 77' is a lever or arm projecting radially from the latter and by means of which the distributer body is oscillated as the agitator 75' remains fixed.

The agitator-driving mechanism includes a pitman rod 80 having a socket 81 at its inner end loosely connected with a ball 82 at the outer end of a crank pin 83 projecting from said crank wheel 38, and the outer end of the pitman rod is loosely connected with one agitating mechanism, while the latter in turn is connected with the other agitating mechanism by a cross link 85. In the drawings I have shown this link connecting the levers 77 and 77' of agitating mechanisms of two different types, but the illustration clearly shows that they could be used simultaneously although the driving mechanism and link cause the reciprocation of one agitator within a distributer body which remains fixed, and the oscillation of the other distributer body relative to its fixed agitator.

While this improved machine may be used for the distribution of any appropriate granular or powdered material, including seeds, poison, fertilizer, etc., I prefer to employ it for the distribution of plaster and the size of the distributer bodies or hoppers and the outlet openings therefrom will be determined by the nature of the substance to be distributed. After the hoppers are filled and a horse hooked between the thills, the driver takes his seat and drives to the field of action, keeping his foot off the treadle 54 so that the power mechanism is disconnected from the agitator. Having arrived where the material is to be distributed, the horse is directed carefully between two rows of plants if such material is a poison, and the brackets 70 are adjusted on the rock shaft 67 so that the distributers or hoppers shall be spaced a distance equal to that between the rows of plants. The sub-frame is then adjusted by means of the lever 20 so that it will pass over the tops of the plants if poison or fertilizer is to be distributed or will travel nearer the surface if desired; and thereafter the hoppers will travel at a fixed height except when they are raised occasionally by the lever 20 as when an obstruction or an exceptionally high plant is reached. In doing this the rod 68 slides through the eye 69, and the distributers and their frame are kept level. The purpose of the horizontal frame 61 and its adjustment around the king bolt as controlled by manipulation of the lever 64, is to allow the operator to swing the entire distributing mechanism either temporarily or permanently. For instance, if a plant or a spot is reached and is about to be passed where more of the material ought to be dropped than usual, the operator can swing that end of the frame with its hopper to the rear and the continued agitation will cause the distribution of extra material. Also, if it be found that the rows are closer together at some points than the distance to which the two brackets 70 have been set, it is quite possible to cause the hoppers to move over lines which are nearer each other by setting the frame 61 oblique to the sub-frame instead of substantially at right angles to it as shown. In doing this the rod 68 turns in the eye 69. When it is desired to check the delivery of material, the clutch is thrown open by releasing pressure upon the treadle 54, and doubtless this will be done in turning corners and perhaps temporarily at points where the driver observes that the material is not needed.

One special advantage possessed by this improved machine when used for the distribution of poison in the shape of fine powder, at times when there is more or less wind blowing, lies in the fact that the several adjustments controlled and manipulated by the driver can be employed singly or collectively to prevent the fine poison or other powder from being blown away. As above stated, the hand lever 20 and the mechanism controlled thereby will generally be employed for setting the sub-frame at a permanent height from the surface which will be conditioned upon the size of the plants, although if the day is windy and a fine powder is to be distributed this sub-frame will doubtless be set lower. In addition, however, the adjustment of the frame 61 may be utilized to avoid a gust of wind from scattering the powder if the driver finds that it is being scattered while the shaft 67 stands directly across the machine.

Considerable change in and amplification in the details may be made without departing from the principle of my invention.

What is claimed as new is:

1. In a distributing machine of the character described, a wheeled supporting frame, a sub-frame, means for adjusting the relative position of these frames, the distributing mechanism pivotally mounted on the forward end of said sub-frame, and means for turning it on its pivots to keep it level with relation to the sub-frame independently of the adjustment of the latter with relation to the main frame.

2. In a distributing machine, a wheeled supporting frame, a sub-frame, means for adjusting the relative position of these frames, the distributing mechanism carried by the front end of said sub-frame, means for keeping it level thereon independently of the adjustment of the sub-frame with relation to the main frame, and means for swinging said mechanism horizontally to different angles with the sub-frame.

3. In a distributing machine, a supporting frame, a sub-frame adjustable vertically with relation thereto, a distributer frame adjustable horizontally on the sub-frame, a rock shaft mounted in bearings on the distributer frame, brackets projecting radially from said shaft and carrying the distributers, means for holding them level and independent means for cotnrolling the various adjustments.

4. In a distributing machine, a supporting frame, a sub-frame adjustable vertically with relation thereto, a distributer frame adjustable horizontally on the sub-frame, a rock shaft mounted in bearings on the distributer frame, independent means for controlling the various adjustments, brackets projecting from said shaft and carrying the distributor bodies, automatic means for holding the latter level, agitators in said bodies, the power mechanism, and flexible connections between the latter and the agitating mechanism.

5. In a distributing machine, a supporting frame, a sub-frame adjustable vertically with relation thereto, a distributer frame adjustable horizontally on the sub-frame, a rock-shaft mounted in bearings on the distributer frame, independent means for controlling the various adjustments, the distributer bodies carried by said rock shaft, agitators therein, the power mechanism, an agitator driving wheel flexibly connected with the agitators, and a clutch mechanism between this wheel and the power mechanism.

6. In a distributing machine, the combination with a wheel-supported sub-frame, a distributer frame pivotally mounted on a king bolt therein, means for adjusting it to different angles with the sub-frame, the power mechanism, and a crank wheel rotated thereby; of journal boxes on said distributer frame, a rock shaft therein, brackets on said shaft beyond the distributer frame, distributers carried by the brackets, means for turning said shaft to automatically adjust the level of the distributers, agitators in said distributers, and flexible connections between them and said crank wheel.

7. In a distributing machine, the combination with a sub-frame, a rock shaft extending across the same, and a power driven crank wheel; of a distributing mechanism disposed forward of the ends of said shaft and each including a hopper and an agitator, connections between the agitators and said crank wheel, and for each hopper a bracket secured at one end to the hopper and having its other end formed into an eye embracing the end of the shaft and its extremity bolted to its own body.

8. In a distributing machine, the combination with a supporting frame, a distributer frame mounted on an upright pivot therein, a horizontal rock shaft mounted in bearings on the distributer frame, brackets projecting radially from said shaft; and hoppers carried by the brackets; of an agitator for each hopper, agitator-driving mechanism, the power mechanism, a clutch between the last two mechanisms, and independent means for operating said clutch, rocking said shaft, and turning one frame upon the other.

9. In a distributing machine, the combination with the main frame mounted on wheels, an eye at its front end, a sub-frame hung beneath the main frame, and means for adjusting the height of the sub-frame with relation to that of the main frame; of a distributer-carrying frame pivoted on the sub-frame, means for adjusting it manually in a horizontal plane, a rock shaft across said distributer-carrying-frame, the hoppers adjustably mounted on said rock shaft, the driving mechanism, flexible connections between it and said hoppers for agitating the latter, and an upright rod rising from said rock shaft and playing loosely through said eye in the main frame to permit the vertical adjustment of the sub-frame and the horizontal adjustment of the hopper-frame thereon.

In testimony whereof I have hereunto set my hand in presence of two subscribing witnesses.

NICK MERONEK.

Witnesses:
 F. J. BRZESKI,
 STANISLAW WYRUMINLSKI.

Copies of this patent may be obtained for five cents each, by addressing the "Commissioner of Patents, Washington, D. C."